(12) United States Patent
Ingham

(10) Patent No.: US 8,580,011 B2
(45) Date of Patent: Nov. 12, 2013

(54) URINAL TOILET CONCEPT

(75) Inventor: Jay Ingham, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 350 days.

(21) Appl. No.: 13/066,518

(22) Filed: Apr. 15, 2011

(65) Prior Publication Data

US 2012/0260802 A1    Oct. 18, 2012

(51) Int. Cl.
*B01D 53/22* (2006.01)
*B01D 19/00* (2006.01)

(52) U.S. Cl.
USPC .............. 95/46; 95/243; 95/259; 96/6; 96/9; 96/193

(58) Field of Classification Search
USPC ........... 95/46, 47, 54, 243, 258, 259; 96/6, 9, 96/193, 219; 210/640; 4/316, 317, 318; 604/317, 319
See application file for complete search history.

(56) References Cited

U.S. PATENT DOCUMENTS

| | | | | |
|---|---|---|---|---|
| 4,302,223 A * | 11/1981 | Booth et al. | ........................ | 96/6 |
| 4,316,774 A * | 2/1982 | Trusch | ......................... | 210/640 |
| 4,788,556 A * | 11/1988 | Hoisington et al. | ................ | 96/6 |
| 5,989,318 A * | 11/1999 | Schroll | .............................. | 96/6 |
| 6,171,367 B1 * | 1/2001 | Peng et al. | ........................ | 95/46 |
| 6,632,204 B2 * | 10/2003 | Guldfeldt et al. | ............. | 604/349 |
| 6,740,066 B2 * | 5/2004 | Wolff et al. | ................... | 604/319 |
| 6,942,718 B1 * | 9/2005 | Schmidt | ........................... | 95/46 |

* cited by examiner

*Primary Examiner* — Jason M Greene
(74) *Attorney, Agent, or Firm* — Franklin E. Gibbs

(57) ABSTRACT

A gas and liquid mixture separation and collection system for zero gravity operation that can be applied to a urinal toilet is disclosed. There is an inlet to receive the gas and liquid mixture. The mixture is directed to a filter having an air side. A vacuum pump on the air side of the filter generates a pressure delta to force the inlet flow. A peristaltic pump is used to transfer liquid away from the filter surface. In doing so, the flow on the liquid side of the membrane filter may contain some gas left over from the inlet flow mixture, but there is substantially less gas than in the gas and liquid mixture at the inlet. The filtered mixture is directed to an expandable collection bag that is attached to the air side of the filter so the filter process can be repeated to remove more gas from the mixture.

4 Claims, 4 Drawing Sheets

URINAL TOILET CONCEPT

FIELD OF THE INVENTION

This invention is generally related to separating a gas from a mixture of gas and liquids. More particularly, the invention relates to urinals operating in a zero gravity environment.

BACKGROUND OF THE INVENTION

As humanity ventures into the exploration and commercialization of space, one abiding concern is providing a life sustaining environment. This includes not only accounting for the necessities such as food, water, and breathable oxygen, but also disposal of human waste such as urine.

In the absence of gravity, the process of urinating into a toilet is a bit more difficult to keep some semblance of sanitation. When urinating into a toilet in space (the absence of gravity) there is no natural force that holds the expelled urine into the container, so an artificial force is needed.

Most existing space toilet concepts involve urinating into some sort of vacuum tube that eventually filters the liquid from the air and empties the liquid into a storage container. The difficulty comes in because the quantity of air flow necessary to assure reliable collection of urine creates a flow of mostly air with small amounts of liquid suspended in it, which is difficult to filter in the absence of gravity.

While processing urine and gas in space identifies the need for separation of gas from a gas and liquid mixture, the scope of the invention in general applies to other types of mixtures that do not contain urine. In general, what is needed is a device that can separate the gas from the liquid in a zero gravity environment.

SUMMARY OF THE INVENTION

A gas and liquid mixture separation and collection system for zero gravity operation comprises an inlet to receive the gas and liquid mixture. The mixture is directed to a filter having an air side. A vacuum pump on the air side of the filter generates the pressure delta required to force the appropriate inlet flow. A peristaltic pump is used to transfer liquid away from the filter surface. The filtered liquid is sent to a collection bag that is expandable. The collection bag is also connected to the filter so the mixture can be cycled through the system to obtain the desired degree of separation. As a result, there is substantially less gas in the mixture.

BRIEF DESCRIPTION OF THE DRAWINGS

The invention is generally shown by way of reference to the accompanying drawings in which.

DETAILED DESCRIPTION OF THE INVENTION

Figure 1:
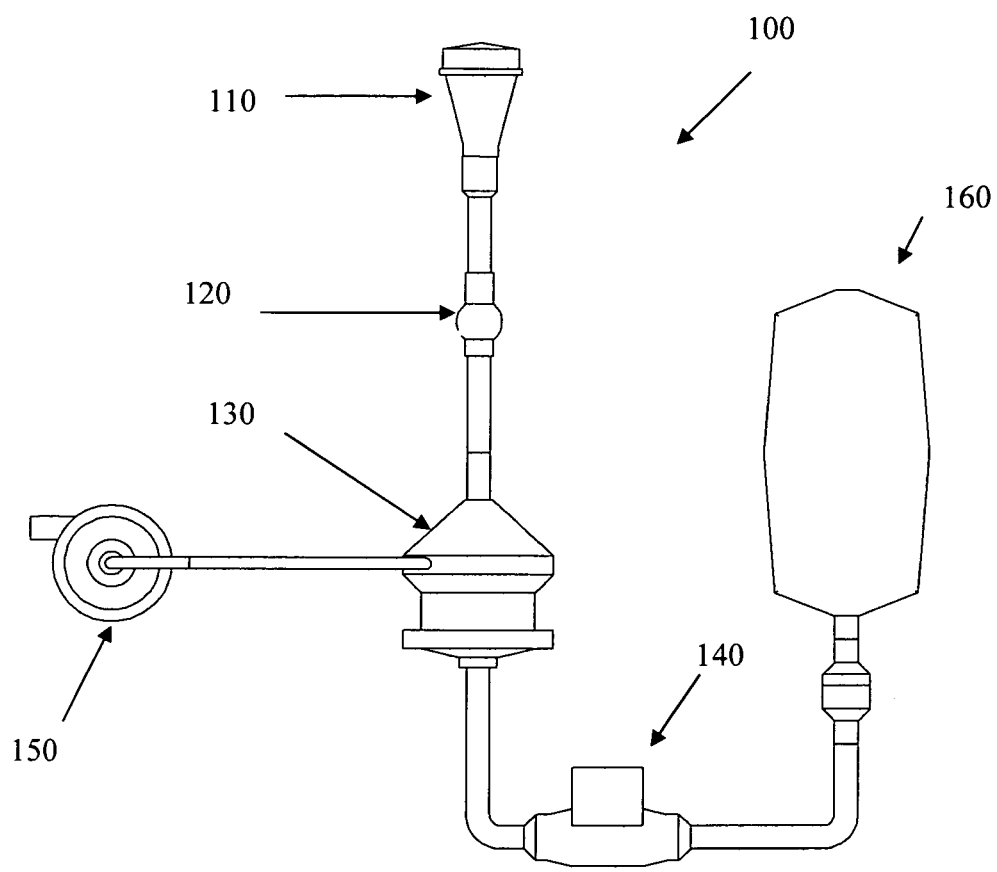
FIG. 1 is a water reclamation unit having a centrifugal separator use in a zero gravity environment.

Turning to FIG. 1, a liquid reclamation unit 100 is shown. A vacuum pump 150 operates to create a differential in pressure to induce flow. The liquid and gas mixture enters the inlet funnel 110 and passes through the shut off valve 120 into the centrifugal separator 130 where a centrifugal pump separates materials. A peristaltic pump 140 directs the mixture into a collection bag 160. The minuses of centrifugal devices are the quantity of moving parts and caustic liquids that come in contact with them.

Figure 2:
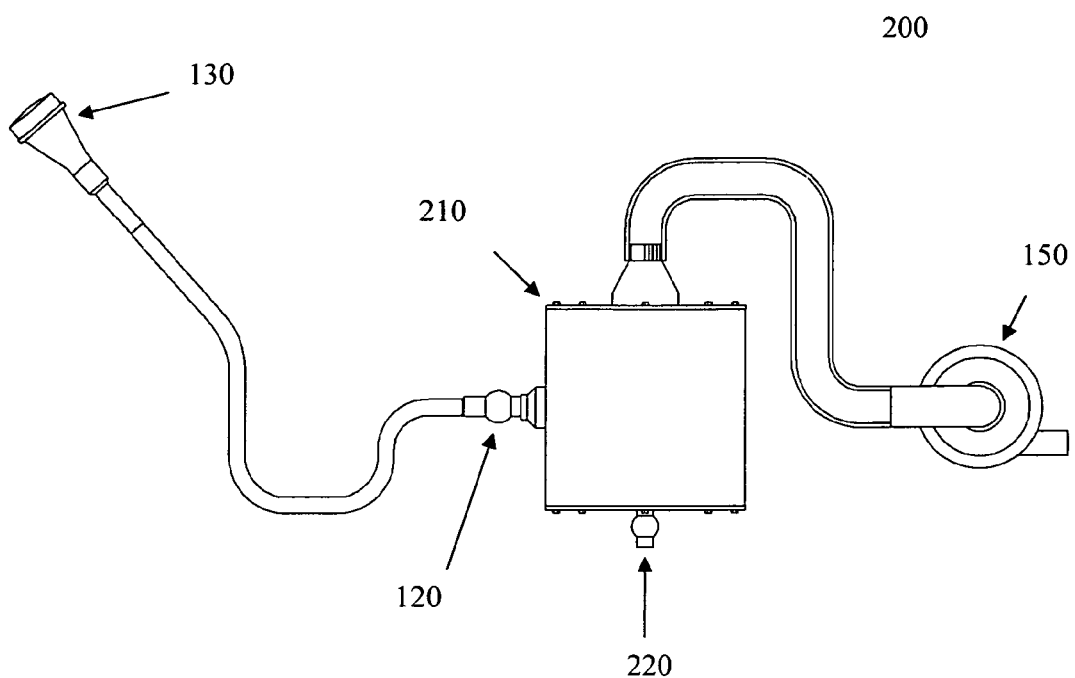
FIG. 2 is a water reclamation unit having a filter and pump configuration.

FIG. 2 represents another type of liquid reclamation unit 200 that utilizes a filter 230. This system is similar to the unit in FIG. 1 in that a vacuum pump 150 operates to create a differential in pressure to induce flow. The liquid and gas mixture enters the inlet funnel 110 and passes through the shut off valve 120. However, from there the mixture goes into a collection tank 210 from which the liquid could be removed by use of a drain valve 240. Until now, the filter systems have had problems with either clogging due to the surface of the filter being covered with liquid, or filter starting to pass liquid onto the air side because of the large pressure deltas.

In the presence of gravity the filter system in FIG. 2 works well. When the filter separates the liquid from the flow, the liquid would simply fall off the filter and be collected in the bottom of a surrounding container. As stated previously, the problems with most pump/filter systems used in minimal gravity occur when the liquid quickly coats the filter, adds restrictions to the flow of the system, and minimizes flow.

The membrane filters, until now, have primarily been used to remove small amounts of gas from a primarily liquid stream. The urinal flow contains the opposite characteristics (mostly gas with a small amount of liquid suspended in it.) The normal use of these filters requires that the air/liquid mixture be forced to flow along the filter (pressure differential created by the peristaltic pump in FIG. 3). When gas comes into contact with the filter, it passes through because of the differential pressure created by the vacuum pump and the liquid stays on the other side of the filter.

Figure 3:
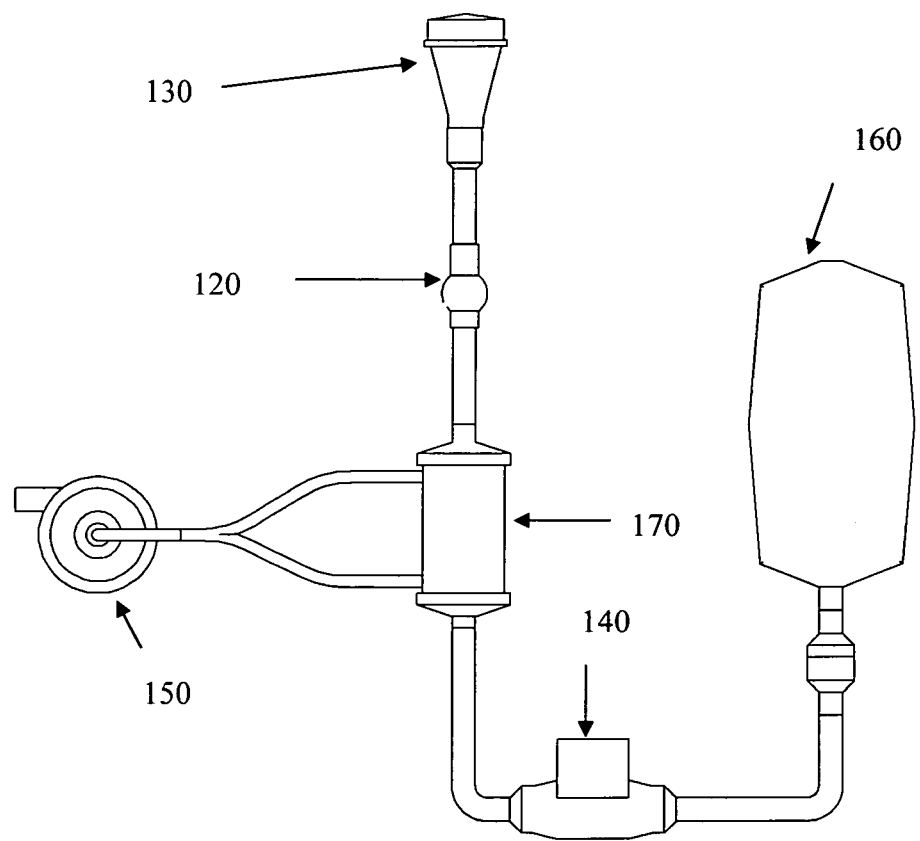
FIG. 3 is a water reclamation unit having a filter and two pumps.

FIG. 3 represents a liquid reclamation unit 300 that has a peristaltic pump 140 and a vacuum pump 150 that are used to address the issues found in a pump filter system such as the one identified in FIG. 2. The two pumps of the liquid reclamation unit 300 vary their flow rates based on the pressure differentials and mixture ratio of the inlet flow. Varying the flow rates of the two pumps provides the following results:

1) If the flow on the liquid side of the filter flows too fast, there is some quantity of gas that is left on the liquid side of the filter.

2) If the flow is too slow, the filter clogs up and restricts flow from the inlet.

Flow rates can be chosen to allow substantial removal of gas from the liquid and at the same time prevent clogging. If the liquid side was pumped at just the proper rate, theoretically, no gas would remain on the liquid side after the filter, and the filter would not clog, allowing adequate inlet flow. This would require large quantities of instrumentation and complex controls which, in turn, would affect the reliability of the system. Even then, the separation of all gas from the inlet flow would be virtually impossible to achieve.

Figure 4:
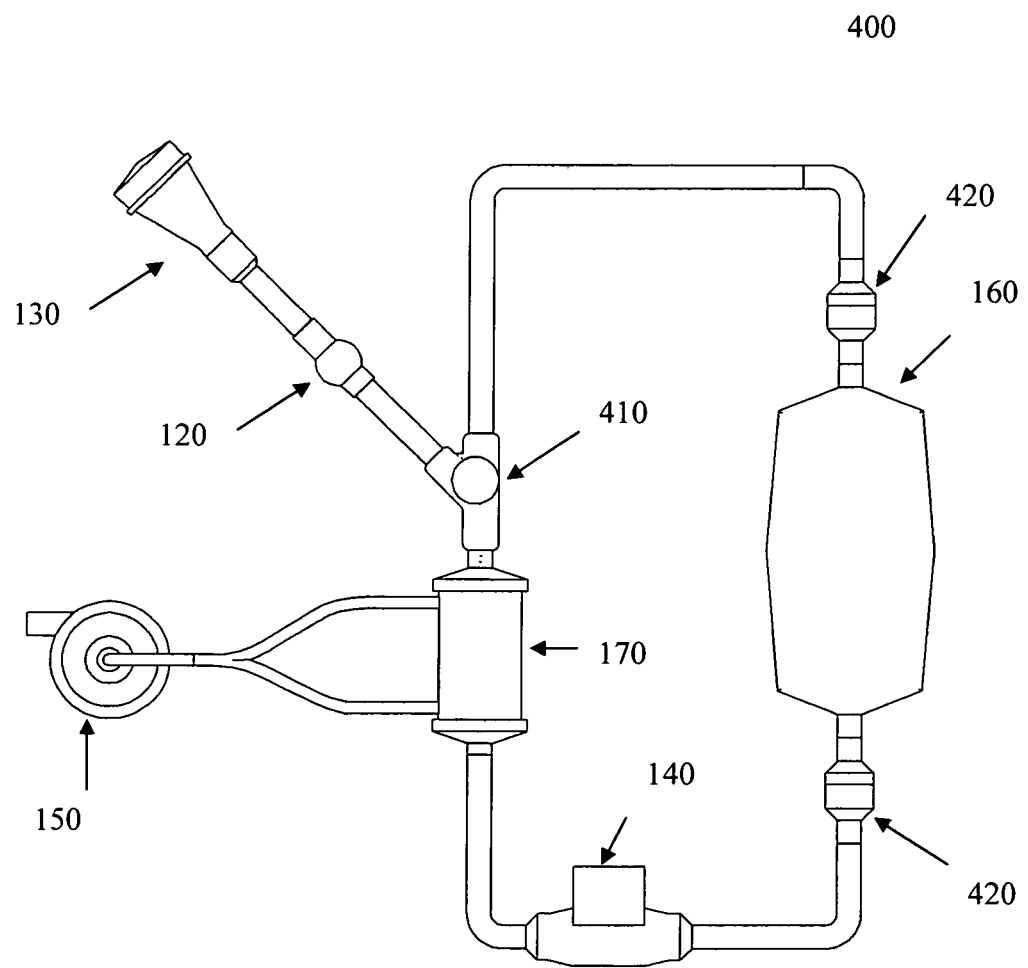
FIG. 4 is one embodiment of a water reclamation unit of the present invention.

FIG. 4 is one embodiment of a liquid reclamation unit 400 in accordance with the present invention and is not limiting to the principles, scope or application of the invention. A vacuum pump 150 operates to create a differential in pressure to induce flow. The liquid and gas mixture enters the inlet funnel 130 and passes through the shut off valve 120 into the filter 170. In one embodiment, the filter 170 contains a membrane utilizing a polyolefin fiber. The flow in an embodiment could be 3 to 15 gpm. In another embodiment, the polyolefin fiber can utilize a pore size of about 0.03 microns and a fiber size of 300 microns outer diameter and 200 microns inside diameter. One embodiment could utilize a 4 inch by 13 inch liquid-cell extra flow membrane contactor. The gas can be of a wide variety of gases such as, for example, an Oxygen and Nitrogen mixture. The liquid can also be of a wide variety including urine. A peristaltic pump 140 directs the mixture into a collection bag 160. The peristaltic pump 140 is used to transfer liquid away from the filter surface and prevent it from clogging the filter surface. In doing so, the flow on the liquid side of the membrane filter may contain some gas left over from the inlet flow mixture. That is not unintentional. If the flow rate in the liquid loop is so low so as to assure no gas is present, the remaining filter area is so low (and creating too great a restriction) as to not allow sufficient flow from the inlet. The flow in the liquid loop must be high enough to get the majority of the liquid off of the membrane filter surface, thus allowing the inlet flow to be mostly unobstructed. This will allow some gas to enter the liquid loop, but that is removed in a secondary operation.

The collection bag 160 has an expandable volume. This allows the system to compensate for variations in mixture compositions and pressure. Without the collection bag 160 operating in such a fashion, the system can achieve vapor lock, which effectively ends the reclamation process. Further, the collection bag 160 can serve the function of retaining the liquid and smaller gas concentrations for transportation.

The collection bag 160 flexibility allows for a closed circuit to allow for compensation that would normally require more complicated corrective systems.

Once the urination event is complete, a shut off valve 120 is closed to cut off flow from the inlet funnel 110. The vacuum pump 150 and the peristaltic pump 140 are both left on and the urine/air mix is circulated until the desired level of gas removal is achieved.

The Y connector 410 allows the gas and fluid mixture to re-circulate through the system. The re-circulation process removes more gas from the mixture. In that fashion, the level of gas in the mixture can be controlled.

When the next urination event is to begin, both pumps are turned on and the shut off valve 120 is opened. This allows some air to enter the system to let the peristaltic pump unclog the filter. The next urination event may then begin.

When a collection bag 160 is full, connectors 420 can be disengaged to allow the collection bag 160 to be removed. The connectors 420 can be of a water tight variety that will help prevent escape of liquid during removal and/or replacement of the collection bag 160.

While embodiments have been described in detail, it should be appreciated that various modifications and/or variations may be made without departing from the scope or spirit of the invention. In this regard it is important to note that practicing the invention is not limited to the applications described herein above. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein above. Thus, it is intended that the invention cover all such embodiments and variations. Nothing in this disclosure is intended to limit the scope of the invention in any way.

What is claimed is:

1. A liquid reclamation unit for separating a gas and liquid mixture for zero gravity operation comprising:
   an inlet to receive the gas and liquid mixture as an inlet flow;
   a filter connected to the inlet and the filter having an air side;
   a vacuum pump connected with the air side of the filter, the vacuum pump facilitating a pressure delta operating to force the appropriate inlet flow such that the gas and liquid mixture is directed to the air side of the filter and the filter operating to filter out an amount of gas from the gas and liquid mixture;
   a peristaltic pump connected with the filter and operating in cooperation with the filter to transfer liquid away from the filter surface, and the liquid transferred away from the filter surface has substantially less gas than the gas and liquid mixture received at the inlet; and
   a collection bag connected to the peristaltic pump and the air side of the filter, the collection bag being relatively flexible;
   wherein, the collection bag receives the filtered gas and liquid mixture from the peristaltic pump and provides said mixture for further processing through connection to the filter.

2. The liquid reclamation unit for separating a gas and liquid mixture for zero gravity operation of claim 1, wherein the liquid is urine.

3. A method for separating a gas and liquid mixture for zero gravity operation comprising the steps of:
   a) receiving a gas and liquid mixture into an inlet;
   b) filtering the gas and liquid mixture such that the filtered gas and liquid mixture has less gas than before filtering;
   c) transferring the filtered gas and liquid mixture into a collection bag and the collection bag being relatively flexible;
   d) transferring the filtered gas and liquid mixture from the collection bag to a filter; and
   repeating steps b through d.

4. A gas and liquid mixture separation and collection system for zero gravity operation comprising:
   an inlet to receive the gas and liquid mixture;
   a filter connected to the inlet and the filter having an air side;
   a vacuum pump connected with the air side of the filter, the vacuum pump facilitating a pressure delta operating to direct the flow of the gas and liquid mixture such that the gas and liquid mixture is directed to the air side of the filter and the filter operating to filter out an amount of gas from the gas and liquid mixture;
   a peristaltic pump connected with the filter and operating in cooperation with the filter to transfer the liquid having less gas away from the filter surface, and the peristaltic pump facilitating an adequate rate of flow to prevent clogging of the filter; and
   a collection bag connected to the peristaltic pump and the air side of the filter, the collection bag being relatively flexible;
   wherein, the collection bag receives the filtered gas and liquid mixture and provides said mixture for further processing through connection to the filter.

* * * * *